United States Patent
Wada

(10) Patent No.: US 9,848,104 B1
(45) Date of Patent: Dec. 19, 2017

(54) IMAGE-PROCESSING APPARATUS, METHOD, AND COMPUTER PROGRAM PRODUCT FOR CORRECTING SKEW IN SCANNED IMAGES

(71) Applicant: PFU LIMITED, Kahoku-shi, Ishikawa (JP)

(72) Inventor: Tomoaki Wada, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/283,689

(22) Filed: Oct. 3, 2016

(30) Foreign Application Priority Data

Jun. 17, 2016  (JP) .................................. 2016-121139

(51) Int. Cl.
*H04N 1/00* (2006.01)
*H04N 1/387* (2006.01)
*G06T 3/60* (2006.01)

(52) U.S. Cl.
CPC .......... *H04N 1/3878* (2013.01); *G06T 3/608* (2013.01); *H04N 1/00718* (2013.01); *H04N 1/00737* (2013.01); *H04N 1/00748* (2013.01); *H04N 1/00763* (2013.01); *H04N 1/00774* (2013.01); *H04N 2201/0081* (2013.01)

(58) Field of Classification Search
None
See application file for complete search history.

(56) References Cited

U.S. PATENT DOCUMENTS

| | | | | | |
|---|---|---|---|---|---|
| 5,497,236 | A | * | 3/1996 | Wolff | G06T 3/0031 358/296 |
| 5,781,660 | A | * | 7/1998 | Nitta | G06K 9/3283 382/173 |
| 8,270,044 | B2 | * | 9/2012 | Seo | G06K 9/3275 356/602 |
| 8,861,054 | B2 | * | 10/2014 | Iwayama | G06K 9/00442 358/538 |
| 9,083,909 | B2 | | 7/2015 | Xie et al. | |
| 9,374,500 | B2 | | 6/2016 | Tsugimura | |

(Continued)

FOREIGN PATENT DOCUMENTS

| | | |
|---|---|---|
| JP | 09-091376 A | 4/1997 |
| JP | 2004-048633 A | 2/2004 |
| JP | 2008-234223 A | 10/2008 |

(Continued)

OTHER PUBLICATIONS

Decision to Grant issued in corresponding Japanese Patent Application No. 2016-121139, dated Aug. 22, 2017.

*Primary Examiner* — Scott A Rogers
(74) *Attorney, Agent, or Firm* — McDermott Will & Emery LLP

(57) ABSTRACT

According to the present disclosure, edges of a document image contained in a read image read by an image-reading apparatus including a paper path are detected, a candidate edge-skew occurrence position is detected, a candidate content-skew occurrence position is detected, an accumulated-skew occurrence position is detected based on the candidate edge-skew occurrence position and the candidate content-skew occurrence position, skew of a document rear-part image rearward from the accumulated-skew occurrence position in the conveyance direction is corrected, and image data corrected for accumulated skew is acquired.

18 Claims, 10 Drawing Sheets

(56) References Cited

U.S. PATENT DOCUMENTS

2014/0294303 A1 10/2014 Kawatani et al.
2015/0256696 A1* 9/2015 Wada ................ H04N 1/00005
　　　　　　　　　　　　　　　　　　　　　358/448

FOREIGN PATENT DOCUMENTS

| JP | 2012-253776 A | 12/2012 |
| JP | 2014-195148 A | 10/2014 |
| JP | 2015-104127 A | 6/2015 |
| JP | 2015-198306 A | 11/2015 |

* cited by examiner

+3 DEGREES ↕ FUFUFU Image Scanner fi-5950

+2 DEGREES ↕ FUFUFU Image Scanner fi-5950

+1 DEGREE ↕ FUFUFU Image Scanner fi-5950

±0 DEGREES ↕ FUFUFU Image Scanner fi-5950

-1 DEGREE ↕ FUFUFU Image Scanner fi-5950

[FIRST HALF OF CONVEYANCE]

OUTPUT IMAGE FOR FIRST
HALF OF CONVEYANCE

[LAST HALF OF CONVEYANCE]

OUTPUT IMAGE FOR LAST
HALF OF CONVEYANCE

⇧ 0.5-DEGREE ROTATION
⇨ 1-PIXEL SHIFT

⇧ 1.0-DEGREE ROTATION
⇨ 2-PIXEL SHIFT

⇧ 2.0-DEGREE ROTATION
⇨ 4-PIXEL SHIFT

OCCURRENCE POSITION

ADOPT LOWER POSITION BECAUSE TWO OCCURRENCE POSITIONS ARE CLOSE TO EACH OTHER

IMAGE-PROCESSING APPARATUS, METHOD, AND COMPUTER PROGRAM PRODUCT FOR CORRECTING SKEW IN SCANNED IMAGES

CROSS-REFERENCE TO RELATED APPLICATION

This application is based upon and claims the benefit of priority from Japanese Patent Application No. 2016-121139, filed on Jun. 17, 2016, the entire contents of which are incorporated herein by reference.

BACKGROUND OF THE DISCLOSURE

1. Field of the Disclosure

The present disclosure relates to an image-processing apparatus, an image-processing method, and a computer program product.

2. Description of the Related Art

Techniques for correcting skew in scanned images have been disclosed heretofore.

As one of those techniques, there has been disclosed a technique that detects skew when a book is pressed against a flat-bed scanner and then detects the boundary point between a straight-line part and a curved-line part of a peripheral shape of a page to correct a part in which the skew has occurred (refer to JP-A-2004-048633).

There has been disclosed another technique that, in an image obtained by reading a book with an overhead scanner, corrects skew by constructing a correction mesh based on the shape and the content of a document, and correcting cells in the mesh so that the cells can be rectangular and be arrayed uniformly (JP-A-2015-104127).

There has been disclosed still another technique that, during document conveyance for facsimile, corrects skew by dividing an image into a plurality of parts in the conveyance direction by use only of ruled lines as dividing positions and as rotation angles, and rotating the individual parts (JP-A-9-091376).

There has been disclosed yet another technique that, in an image read by an automatic document feeder (ADF) scanner, corrects skew in the image by: detecting document edges; approximating each of the edges by a plurality of straight lines; assuming that a point at which there is a change equal to or more than a certain angle in the angle between the straight lines is a position at which skew has occurred; assuming that the respective parts on the both sides of the skew are rectangles; and aligning the positions of these rectangles (JP-A-2015-198306).

However, conventional image-correcting apparatuses (as those disclosed in JP-A-2004-048633 and the like) are inconvenient in that the apparatuses are incapable of, with respect to gentle skew that occurs when a document is conveyed, correcting the skew by deforming only necessary parts thereof.

SUMMARY OF THE DISCLOSURE

It is an object of the present disclosure to at least partially solve the problems in the conventional technology.

An image-processing apparatus according to one aspect of the present disclosure is an image-processing apparatus including an image acquiring unit configured to acquire read image data of a read image read by an image-reading apparatus including a paper path, an edge detecting unit configured to detect edges of a document image contained in the read image and acquires approximate straight lines by extending the longest straight-line parts of the respective edges, an edge-skew detecting unit configured to detect, as a candidate edge-skew occurrence position, on one of the approximate straight lines that is in a document conveyance direction, a position at which the one approximate straight line and an edge containing the longest straight-line part of the one approximate straight line start to separate from each other, a content detecting unit configured to detect direction-identifying contents defined as contents usable for specifying directions within the document image, a content-skew detecting unit configured to detect, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the conveyance direction, an accumulated-skew detecting unit configured to detect an accumulated-skew occurrence position, based on the candidate edge-skew occurrence position and the candidate content-skew occurrence position, and, an accumulated-skew correcting unit configured to acquire accumulated-skew-corrected image data by correcting skew in a document rear-part image located rearward from the accumulated-skew occurrence position in the conveyance direction.

An image-processing method according to another aspect of the present disclosure is an image-processing method including an image acquiring step of acquiring read image data of a read image read by an image-reading apparatus including a paper path, an edge detecting step of detecting edges of a document image contained in the read image and acquiring approximate straight lines by extending the longest straight-line parts of the respective edges, an edge-skew detecting step of detecting, as a candidate edge-skew occurrence position, on one of the approximate straight lines that is in a document conveyance direction, a position at which the one approximate straight line and an edge containing the longest straight-line part of the one approximate straight line start to separate from each other, a content detecting step of detecting direction-identifying contents defined as contents usable for specifying directions within the document image, a content-skew detecting step of detecting, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the conveyance direction, an accumulated-skew detecting step of detecting an accumulated-skew occurrence position, based on the candidate edge-skew occurrence position and the candidate content-skew occurrence position, and, an accumulated-skew correcting step of acquiring accumulated-skew-corrected image data by correcting skew in a document rear-part image located rearward from the accumulated-skew occurrence position in the conveyance direction.

A computer program product according to still another aspect of the present disclosure is a computer program product having a non-transitory tangible computer readable medium including programmed instructions for causing, when executed by a computer, the computer to perform an image-processing method including an image acquiring step of acquiring read image data of a read image read by an image-reading apparatus including a paper path, an edge detecting step of detecting edges of a document image contained in the read image and acquiring approximate straight lines by extending the longest straight-line parts of the respective edges, an edge-skew detecting step of detecting, as a candidate edge-skew occurrence position, on one of the approximate straight lines that is in a document conveyance direction, a position at which the one approximate straight line and an edge containing the longest straight-line part of the one approximate straight line start to separate from each other, a content detecting step of detecting direction-identifying contents defined as contents usable for specifying directions within the document image, a content-skew detecting step of detecting, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the conveyance direction, an accumulated-skew detecting step of detecting an accumulated-skew occurrence position, based on the candidate edge-skew occurrence position and the candidate content-skew occurrence position, and, an accumulated-skew correcting step of acquiring accumulated-skew-corrected image data by correcting skew in a document rear-part image located rearward from the accumulated-skew occurrence position in the conveyance direction.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

An image-processing apparatus, an image-processing method, and a computer program product according to the present disclosure will be described in detail below with reference to drawings. Note that the present disclosure is not limited to this embodiment.

Configuration of the Embodiment

Figure 1:
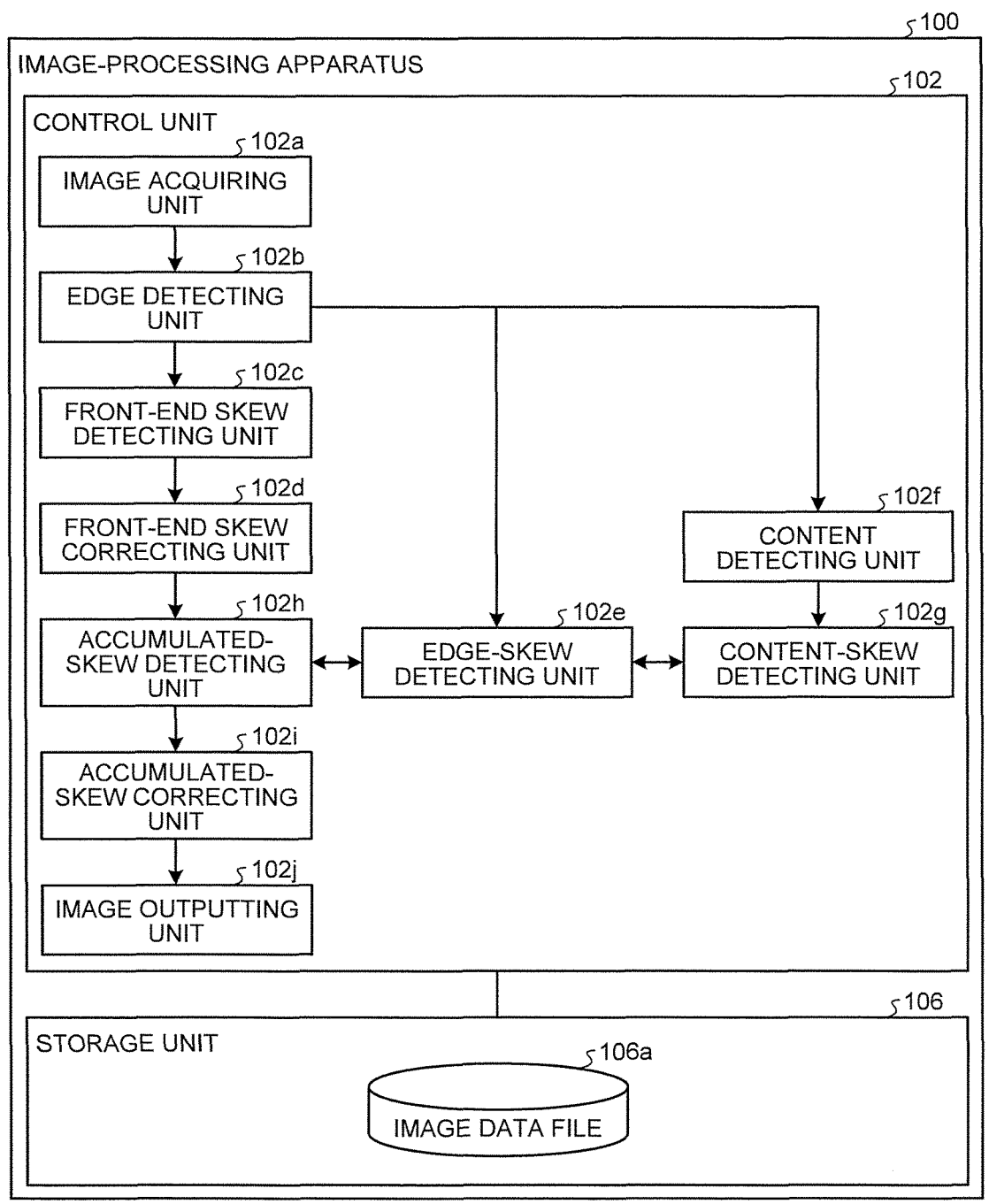
FIG. 1 is a functional block diagram of an example of the configuration of an image-processing apparatus according to one embodiment.

An example of the configuration of an image-processing apparatus 100 according to an embodiment of the present disclosure will be described below with reference to FIGS. 1 and 2, and then, processing etc. according to the embodiment will be described in detail. FIG. 1 is a functional block diagram of the example of the configuration of the image-processing apparatus 100 according to the embodiment.

In the embodiment described below, the image-processing apparatus 100 will be described as an example in order to specify the technical idea of the present disclosure. It is not intended to limit the present disclosure to the image-processing apparatus 100, and the present disclosure is applicable equally to image-processing apparatuses 100 of other embodiments included in the scope of the claims.

Function distribution of the image-processing apparatus 100 described as an example in the embodiment is not limited to the configuration described later. The image-processing apparatus 100 can be configured in such a manner that any units are functionally or physically separated or integrated, as long as similar advantageous effects and functions can be exhibited.

The image-processing apparatus 100 includes, as schematically illustrated in FIG. 1, a control unit 102 and a storage unit 106. These sections of the image-processing apparatus 100 are connected communicatively to each other via an optional communication path.

The image-processing apparatus 100 of the embodiment may be connected to an image-reading apparatus 200 (this section is not shown in FIG. 1). The image-processing apparatus 100 may include the image-reading apparatus 200 in its housing.

The image-reading apparatus 200 including a paper path may be a document scanner of a manual insertion paper feeding system (Continuous Document Feeding (CDF) system), a document scanner of an automatic document feeding system (ADF system) or the like.

The image-processing apparatus 100 may further include an input/output unit 112 (this section is not shown in FIG. 1). The input/output unit 112 performs input/output (I/O) of data.

The input/output unit 112 may be any one, some or all of a key input unit, a touch panel, a control pad (a touch pad, a game pad or the like), a mouse, a keyboard, and a microphone, for example.

The input/output unit 112 may be any one or both of a display unit (a display, a monitor, a touch panel made of crystal liquid or organic EL or the like) configured to display information such as an application, and a sound output unit (a speaker or the like) configured to output sound information as sound.

The image-processing apparatus 100 may further include an interface unit 108. The image-processing apparatus 100 may be connected intercommunicatively to an external apparatus (for example, image-reading apparatus 200 or the like) via the interface unit 108.

The interface unit 108 may be any one or both of an antenna to be connected to any one or both of a communication line and a telephone line, and an interface (NIC or the like) to be connected to a communication apparatus such as a router. Moreover, it may be a communication interface that performs a communication control between the image-processing apparatus 100 and a network.

The network may include remote communications or the like such as any one or both of wire communications and wireless communications (WiFi or the like). The interface unit 108 may be an input/output interface that performs input/output control between the image-reading apparatus 200 or the like and the control unit 102.

The control unit 102 may control the interface unit 108 and the input/output unit 112.

The storage unit 106 stores any one, some, or all of various kinds of database, tables, and files (image data file 106a and the like). Moreover, the storage unit 106 may store various kinds of application programs (for example, user applications and the like).

The storage unit 106 is a storage unit that may be any one, some, or all of a memory such as a random access memory (RAM) or a read-only memory (ROM), a fixed disc device such as a hard disc, a solid state drive (SSD), a flexible disc, and an optical disc, for example.

The storage unit 106 may store computer programs and the like for giving instructions to a central processing unit (CPU) and to perform various processes.

The image data file 106a out of these constituent elements of the storage unit 106 stores image data. Here, the image data may be data read by the image-reading apparatus 200, document image data, accumulated-skew-corrected image data or the like.

The control unit 102 may be constituted of tangible controllers that controls generally the image-processing apparatus 100, including any one, some, or all of CPU, a graphics processing unit (GPU), a digital signal processor (DSP), a large scale integration (LSI), an application specific integrated circuit (ASIC), a field-programming gate array (FPGA) and the like, or control circuitry.

The control unit 102 has an internal memory for storing a control program, a program that regulates various procedures or the like, and required data, and it performs information processing for executing various processes based on these programs.

The control unit 102 broadly includes an image acquiring unit 102a, an edge detecting unit 102b, a front-end skew detecting unit 102c, a front-end skew correcting unit 102d, an edge-skew detecting unit 102e, a content detecting unit 102f, a content-skew detecting unit 102g, an accumulated-skew detecting unit 102h, an accumulated-skew correcting unit 102i, and an image-outputting unit 102j.

The image acquiring unit 102a acquires image data. The image acquiring unit 102a may acquire read image data of a read image read by the image-reading apparatus 200 including a paper path. The image acquiring unit 102a may store image data in the image data file 106a.

The edge detecting unit 102b detects edges of a document image contained in a read image. The edge detecting unit 102b may acquire approximate straight lines by extending the longest straight-line parts of the respective detected edges.

The edge detecting unit 102b may specify the document image from the read image based on the detected edges to acquire document image data.

The front-end skew detecting unit 102c detects front-end skew defined as an inclination of the document image with respect to the read image. The front-end skew may be an inclination due to an angle formed at the start of sheet feeding.

The front-end skew detecting unit 102c may detect inclinations of all of the approximate straight lines of the document image with respect to the read image to detect the front-end skew defined as an inclination of the document image with respect to the read image.

Based on the front-end skew, the front-end skew correcting unit 102d corrects the document image so as to erect the document image.

The edge-skew detecting unit 102e detects, as a candidate edge-skew occurrence position, on one of the approximate straight lines that is in a document conveyance direction, a position at which the one approximate straight line and an edge containing the longest straight-line part of the one approximate straight line start to separate from each other.

The content detecting unit 102f detects direction-identifying contents defined as contents usable for specifying directions within the document image.

Here, the content detecting unit 102f may detect an angle between the one of the approximate straight lines that is in the document conveyance direction and a character string in the document image by: detecting the character string; calculating the areas of rectangles circumscribed to the character string while rotating the character string, the rectangles each being defined by line segments parallel to the approximate straight line in the document conveyance direction and horizontal line segments; and specifying a rotation angle corresponding to the smallest one of the areas.

The content detecting unit 102f may detect an angle between the one of the approximate straight lines that is in the document conveyance direction and a character string in the document image by: detecting the character string; performing optical character recognition (OCR) on the character string while rotating the character string; and specifying a rotation angle at which accuracy of the character recognition is the highest.

The content detecting unit 102f may detect straight-line elements of the contents by a Hough transform.

The content-skew detecting unit 102g detects, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the document conveyance direction.

The content-skew detecting unit 102g may detect, as the candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and a side of a rectangular graphic region, the rear angle being an angle between the approximate straight line and one of the direction-identifying contents that is located rearward from the rectangular graphic region in the document conveyance direction.

The content-skew detecting unit 102g may detect, as the candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and a ruled line, the rear angle being an angle between the one approximate straight line and one of the direction-identifying contents that is located rearward from the ruled line in the document conveyance direction.

The content-skew detecting unit 102g may detect, as the candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and a character string, the rear angle being an angle between the one approximate straight line and one of the direction-identifying contents that is located rearward from the character string in the document conveyance direction.

Based on the candidate edge-skew occurrence position and the candidate content-skew occurrence position, the accumulated-skew detecting unit 102h detects an accumulated-skew occurrence position. The accumulated skew may be an inclination due to gradual formation of an angle during conveyance.

On conditions that the candidate edge-skew occurrence position and the candidate content-skew occurrence position have been detected and that the distance between the detected positions is equal to or less than a certain distance, the accumulated-skew detecting unit 102h may detect, as the accumulated-skew occurrence position, one of the candidate positions that is located rearward from the other in the document conveyance direction.

On conditions that the candidate edge-skew occurrence position has been detected by the edge-skew detecting unit 102e and that the direction-identifying content has not been detected by the content detecting unit 102f, the accumulated-skew detecting unit 102h may detect the candidate edge-skew occurrence position as the accumulated-skew occurrence position.

On conditions that the candidate edge-skew occurrence position has been detected by the edge-skew detecting unit 102e and that the candidate content-skew occurrence position has not been detected by the content-skew detecting unit 102g, the accumulated-skew detecting unit 102h may detect the candidate edge-skew occurrence position as the accumulated-skew occurrence position.

On conditions that the candidate edge-skew occurrence position has not been detected by the edge-skew detecting unit 102e and that the candidate content-skew occurrence position has been detected by the content-skew detecting unit 102g, the accumulated-skew detecting unit 102h may detect the candidate content-skew occurrence position as the accumulated-skew occurrence position.

On conditions that the candidate edge-skew occurrence position and the candidate content-skew occurrence position have been detected and that the distance between the detected positions is more than the certain distance, the accumulated-skew detecting unit 102h may assume that no accumulated skew has occurred and detect no accumulated-skew occurrence position.

On conditions that the candidate edge-skew occurrence position has not been detected by the edge-skew detecting unit 102e and that any direction-identifying content has not been detected by the content detecting unit 102f, the accumulated-skew detecting unit 102h may assume that no accumulated skew has occurred and detect no accumulated-skew occurrence position.

On conditions that the candidate edge-skew occurrence position has not been detected by the edge-skew detecting unit 102e and that the candidate content-skew occurrence position has not been detected by the content-skew detecting unit 102g, the accumulated-skew detecting unit 102h may assume that no accumulated skew has occurred and detect no accumulated-skew occurrence position.

The accumulated-skew correcting unit 102i acquires accumulated-skew-corrected image data by performing skew correction on a document rear-part image rearward from the accumulated-skew occurrence position in the document conveyance direction.

The accumulated-skew correcting unit 102i may acquire accumulated-skew-corrected image data by: assuming that the document rear-part image rearward from the accumulated-skew occurrence position in the document conveyance direction is a region bounded by two circular sectors; and correcting skew by bringing the arcs of the circular sectors onto approximate straight lines that are in the document conveyance direction.

The accumulated-skew correcting unit 102i may acquire accumulated-skew-corrected image data by: assuming that a document rear-part image rearward from the accumulated-skew occurrence position in the document conveyance direction is a region bounded by two circular sectors; and correcting skew by geometrically transforming the arcs of the circular sectors onto the approximate straight lines that are in the document conveyance direction.

The accumulated-skew correcting unit 102i may acquire accumulated-skew-corrected image data by: assuming that the document rear-part image rearward from the accumulated-skew occurrence position in the document conveyance direction is a region bounded by two circular sectors; and correcting skew by geometrically transforming, in a manner that extends the shorter one of these arcs, the arcs of the circular sectors onto the approximate straight lines that are in the document conveyance direction.

The accumulated-skew correcting unit 102i may acquire accumulated-skew-corrected image data by correcting skew by performing lens skew correction on the document rear-part image rearward from the accumulated-skew occurrence position in the document conveyance direction.

The accumulated-skew-corrected image may be an image obtained by synthesizing, with a document front-part image frontward from the accumulated-skew occurrence position, the document rear-part image corrected for skew by the accumulated-skew correcting unit 102*i*.

The image-outputting unit 102*j* outputs image data. The image-outputting unit 102*j* may output image data through the input/output unit 112.

Furthermore, an example of hardware configuration of the image-processing apparatus 100 according to the embodiment will be explained with reference to FIG. 2. FIG. 2 is a block diagram of an example of a hardware configuration of the image-processing apparatus 100 according to the embodiment.

Figure 2:
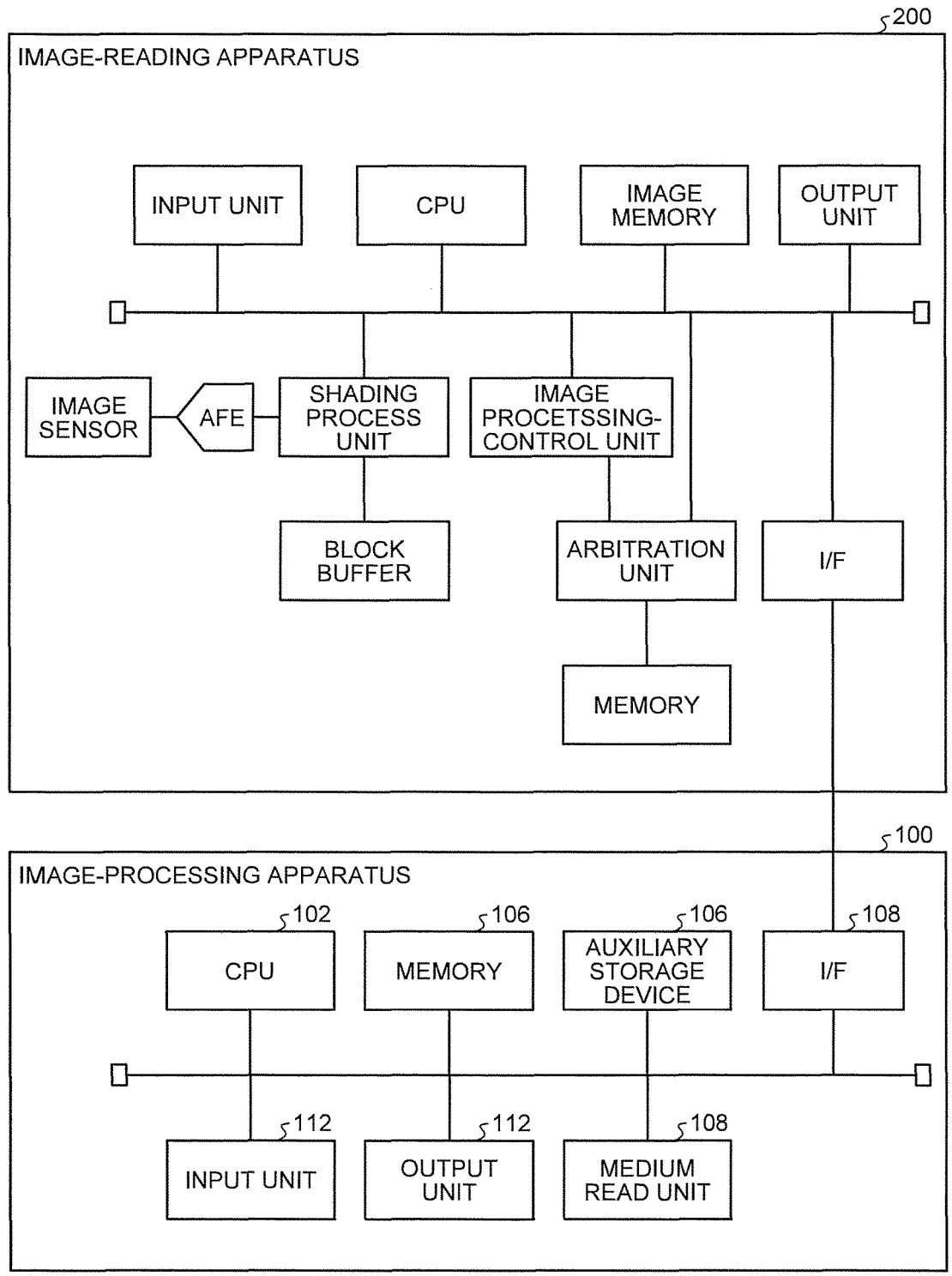
FIG. 2 is a block diagram of an example of the hardware configuration of the image-processing apparatus according to the embodiment.

As illustrated in FIG. 2, the image-processing apparatus 100 may be connected communicatively to the image-reading apparatus 200 via the interface unit (I/F) 108.

As illustrated in FIG. 2, the image-processing apparatus 100 may include a CPU 102 that generally controls the image-processing apparatus 100, the memory 106 and an auxiliary storage device 106 as storage units.

Further, as illustrated in FIG. 2, the image-processing apparatus 100 may include, for example, an I/F 108 that controls communicative connection to the image-reading apparatus 200, an interface unit (medium read unit) 108 such as a USB port for connecting a recording medium or the like, the input/output unit (input unit) 112 for performing data input, and the input/output unit (output unit) 112 for performing data output.

Further, as illustrated in FIG. 2, the image-reading apparatus 200 may include a CPU that generally controls the image-reading apparatus 200, a block buffer, a memory and an image memory as storage units, and an arbitration unit that arbitrates an access request to the memory.

Further as illustrated in FIG. 2, the image-reading apparatus 200 may include an image sensor that performs image reading, an analog front end (AFE) as an analog circuit that connects the image sensor and a shading process unit, and a shading process unit that adjusts shades of the image data.

Further, as illustrated in FIG. 2, the image-reading apparatus 200 may include, for example, an image-processing-control unit that controls image processing on the read image data, an I/F (interface unit) that controls communicative connection to the image-processing apparatus 100, an input unit for performing data input, and an output unit for performing data output.

Processing of the Embodiment

Figure 3:
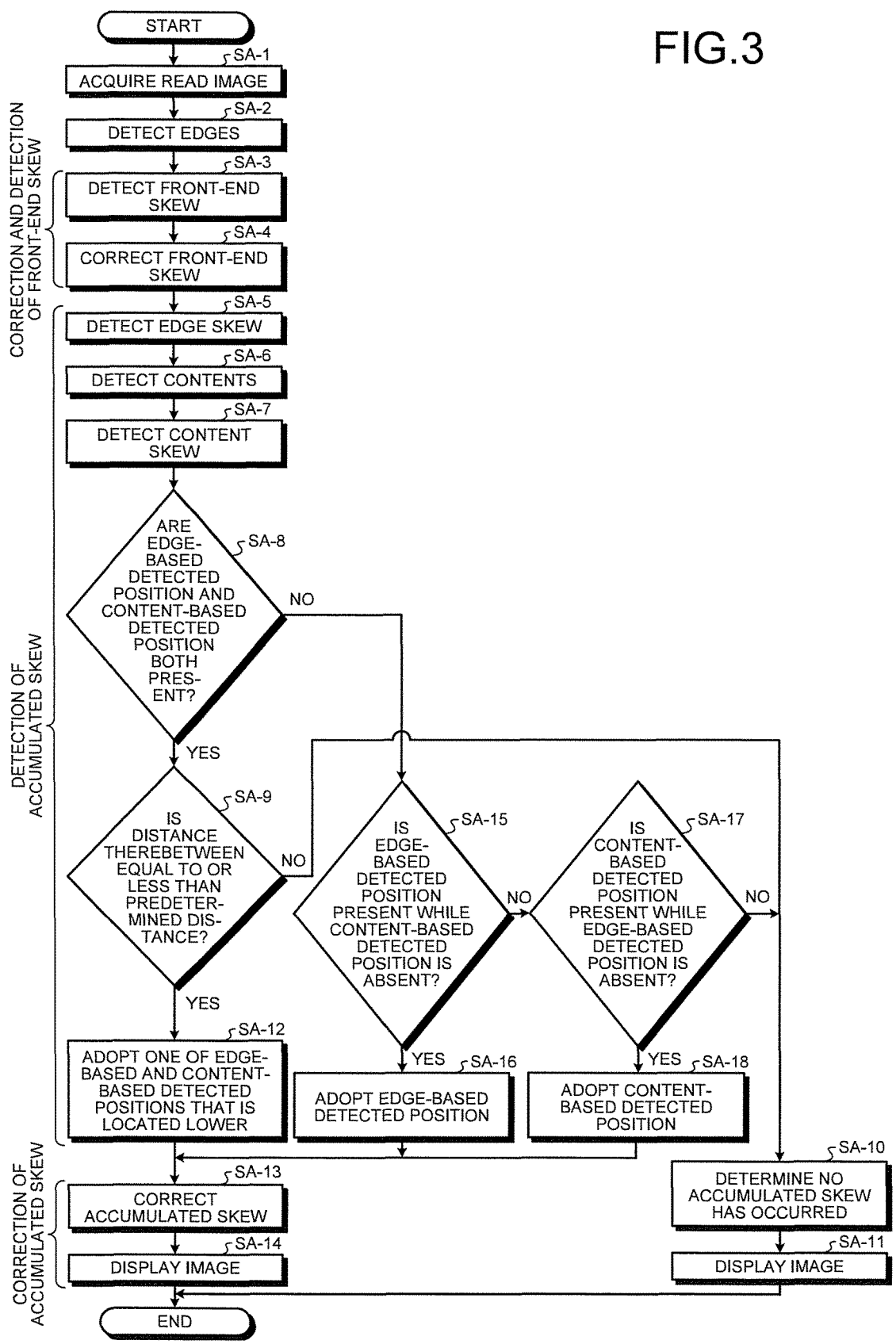
FIG. 3 is a flowchart of an example of processing in the image-processing apparatus according to the embodiment.

An example of processing executed in the image-processing apparatus 100 having the above-described configuration will be explained with reference to FIG. 3 to FIG. 17. FIG. 3 is a flowchart of an example of processing in the image-processing apparatus 100 of the embodiment.

As shown in FIG. 3, at the start, the image acquiring unit 102*a* acquires read image data read by the image-reading apparatus 200 including a paper path (Step SA-1).

Subsequently, the edge detecting unit 102*b* detects edges of a document image contained in the read image, and acquires approximate straight lines by extending the longest straight-line parts of the respective detected edges (Step SA-2).

Here, the edge detecting unit 102*b* may specify the document image from the read image, based on the detected edges to acquire document image data.

Subsequently, the front-end skew detecting unit 102*c* detects front-end skew defined as an inclination of the document image with respect to the read image (Step SA-3).

Subsequently, based on the front-end skew detected by the front-end skew detecting unit 102*c*, the front-end skew correcting unit 102*d* corrects the document image so as to erect the document image (Step SA-4).

That is, the front-end skew correcting unit 102*d* is capable of eliminating the front-end skew to erect the document image.

Figure 4:
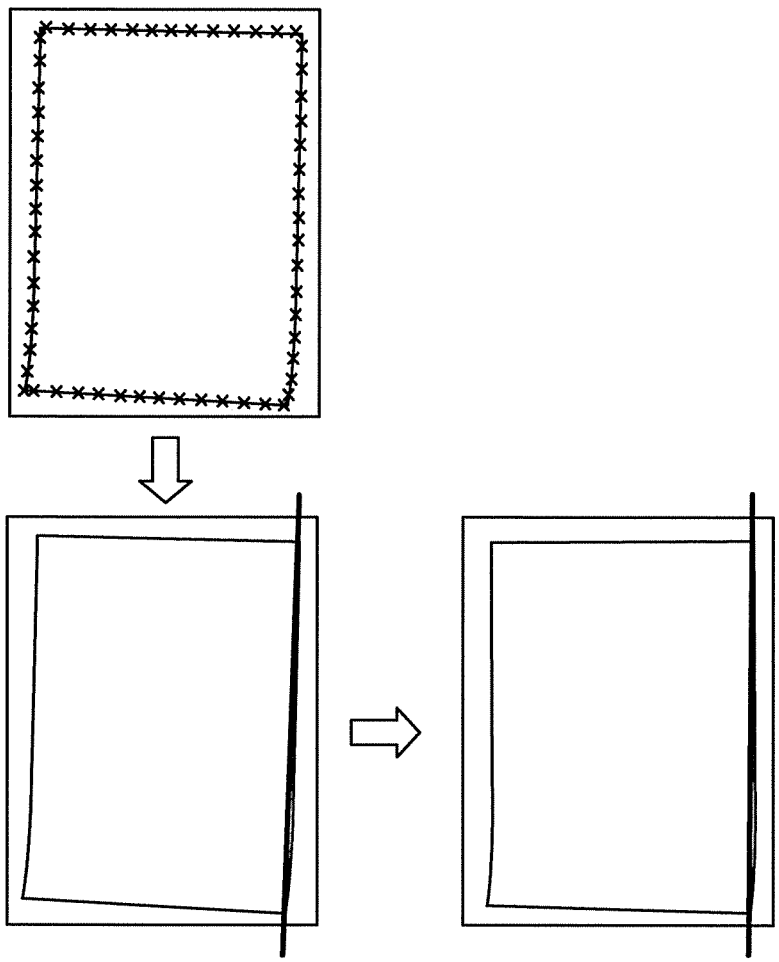
FIG. 4 is a diagram of an example of the process of detecting and correcting front-end skew in the embodiment.

Here, with reference to FIG. 4, an example of the process of detecting and correcting front-end skew in the embodiment will be explained. FIG. 4 is a diagram of an example of the process of detecting and correcting front-end skew in the embodiment.

As shown in FIG. 4, in the embodiment, an approximate straight line obtained by extending the longest straight-line part of the longest one (in the document conveyance direction) of the detected edges (line segments obtained by connecting points denoted as "X" in FIG. 4), and the inclination of this approximate straight line are acquired.

Subsequently, in the embodiment, based on the inclination of the approximate straight line in the document conveyance direction, the document image is corrected to erect in a manner that causes the approximate straight line in the document conveyance direction to erect.

As shown in FIG. 4, in the embodiment, the inclination of the entire document image is detected and corrected, and factors of inclination caused as a result of inclined paper feeding are eliminated without consideration for skew (accumulated skew) due to skew caused during conveyance.

In this embodiment, the disclosure disclosed in JP-A-2007-88654 for detecting inclination and cutting out a document assuming that there is no accumulated skew may be used in this process.

As described above, when the process of detecting and correcting front-end skew in the embodiment is performed, accumulated skew is eliminated, so that a document image that is fed straight can be acquired and so that an erected side can be used as a side that serves as a reference in correcting accumulated skew.

Alternatively, in the embodiment, the inclination of the entire document image may be detected and corrected as the front-end skew in such a manner that the angles of the respective vertices of a document are detected by used of approximate straight lines obtained by extending the longest straight-line parts of all edges of the document.

Note that the front-end skew can be corrected independently of accumulated skew because the front-end skew is an inclination caused only when a document is set or when the document is pulled in immediately after the start of paper feeding, and causes an inclination in angle of the entire document but does not cause skew in the document.

With reference back to FIG. 3, the edge-skew detecting unit 102*e* detects, as a candidate edge-skew occurrence position, on one of the approximate straight lines that is in the document conveyance direction, a position at which the one approximate straight line and one of the edges that contains the longest straight-line part of the one approximate straight line start to separate from each other (Step SA-5).

Figure 5:
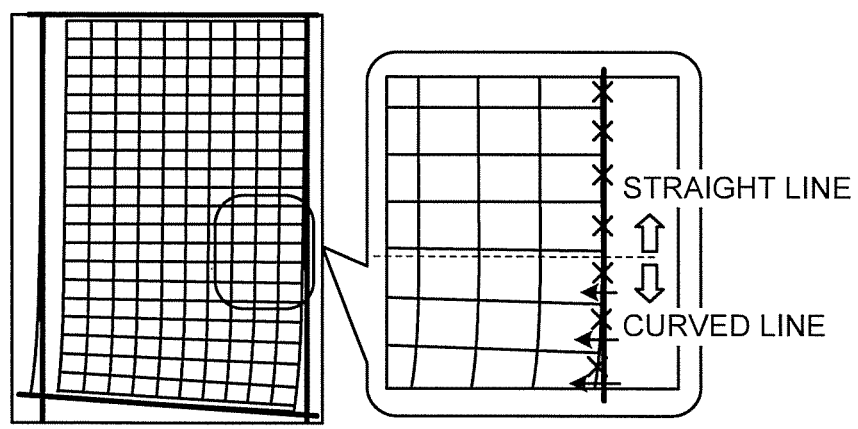
FIG. 5 is a diagram of an example of the process of detecting edge skew in the embodiment.

Here, with reference to FIG. 5, an example of the process of detecting edge skew in the embodiment will be explained. FIG. 5 is a diagram of an example of the process of detecting edge skew in the embodiment.

As shown in FIG. 5, when accumulated skew has occurred, the longest edge in the document conveyance direction gradually shifts to the left in such a manner as to draw away from the approximate straight line.

Therefore, in the embodiment, a position (the position of the dotted line in FIG. 5) that satisfies the conditions that it has a distance equal to or more than 1 mm from the approximate straight line and that it continues shifting in the same direction thereafter may be detected as the candidate edge-skew occurrence position.

With reference back to FIG. 3, the content detecting unit 102*f* detects direction-identifying contents defined as contents usable for specifying directions within the document image (Step SA-6).

Subsequently, the content-skew detecting unit 102*g* detects, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the document conveyance direction (Step SA-7).

Figures 6, 7:
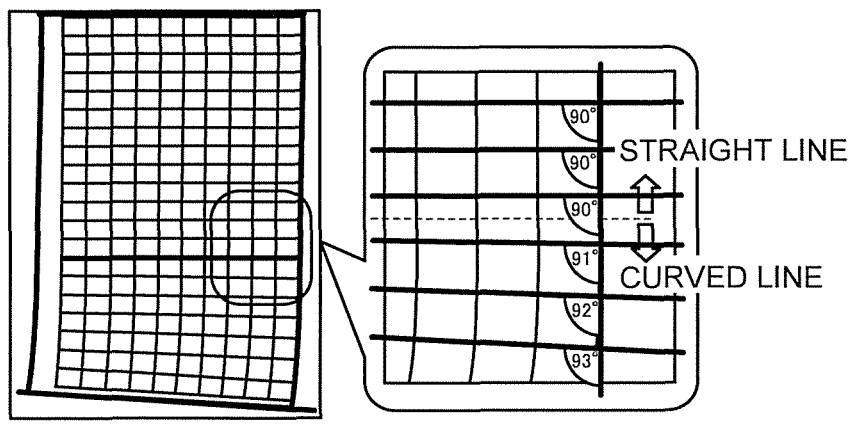
FIG. 6 is a diagram of an example of the process of detecting content skew in the embodiment.
FIG. 7 is a diagram of another example of the process of detecting content skew in the embodiment.

Here, with reference to FIG. 6, an example of the process of detecting content skew in the embodiment using ruled lines will be explained. FIG. 6 is a diagram of an example of the process of detecting content skew in the embodiment.

As shown in FIG. 6, in the embodiment, the respective ruled lines are used as the direction-identifying contents in calculating inclinations, and, when the inclinations are observed in the document conveyance direction, the angles between the approximate straight line and the respective ruled lines successively increase as the ruled lines are located farther from the accumulated-skew occurrence position.

In the embodiment, a position (the position of the dotted line in FIG. 6) that satisfies the conditions that it is located where the angle between the approximate straight line and one of the ruled lines is equal to or more than 0.5 degrees plus or minus the right angle (90 degrees) and that the angles continue to increase thereafter may be detected as the candidate content-skew occurrence position.

In the embodiment, a general Hough transform may be used to extract elements corresponding to line segments, such as ruled lines, in the document image, and those having lengths equal to or more than a certain length may be used as constituent elements of the direction-identifying contents.

Here, in the embodiment, any line-segment element having a length equal to or less than 3 cm and forming an angle with the approximate straight line that is 5 degrees or more from the horizontal direction (0 degrees) or from the vertical direction (90 degrees) may be excluded from constituent elements of the direction-identifying content because various line-segment elements in the document image, such as a part of a large character, are detected in the same manner as ruled lines are detected.

With reference to FIG. 7, an example of the process of detecting content skew in the embodiment using a character string will be explained. FIG. 7 is a diagram of an example of the process of detecting content skew in the embodiment.

In the embodiment, the angle (content skew) of a character string detected as a direction-identifying content may be detected in the following manner. With the character string broken up into certain units (character-string blocks), the angles of the character-string blocks are detected while being rotated, and the optimum angle is calculated in degrees.

Here, a method for calculating the optimum angle in the embodiment may include calculating, as the optimum angle, an angle at which the rectangle circumscribed to the character string or the height of the character string is the smallest, or an angle at which the highest confidence is obtained by an OCR process based on matching with respect to each character.

For example, as shown in FIG. 7, the heights of rectangles each circumscribed to the character string may be calculated while a character string (that is, a character-string image) extracted from a document image is rotated. Each of the rectangles is formed of line segments parallel to the approximate straight lines in the document conveyance direction and horizontal line segments.

Here, the character string shown in FIG. 7 is inclined −1 degree, and one of the circumscribed rectangles that is obtained when the character string is rotated +1 degree has the smallest height. It may therefore be determined that this character string is inclined −1 degree.

Here, in the embodiment, extraction of a character string may include (1) binarizing a document image using a variable threshold (separating the contents from a base color) by use of the Otsu's binarization or the like, and (2) labeling each region separated by the binarization and extracting a rectangular region that encircles the region.

In the embodiment, the extraction of a character string may further include (3) determining any extremely large rectangular region to be a graphic and determining any small rectangular region to be a character, and (4) rectangular regions of the same size that are located within a distance equal to or less than a certain distance are connected as characters that are lined up.

Figure 8:
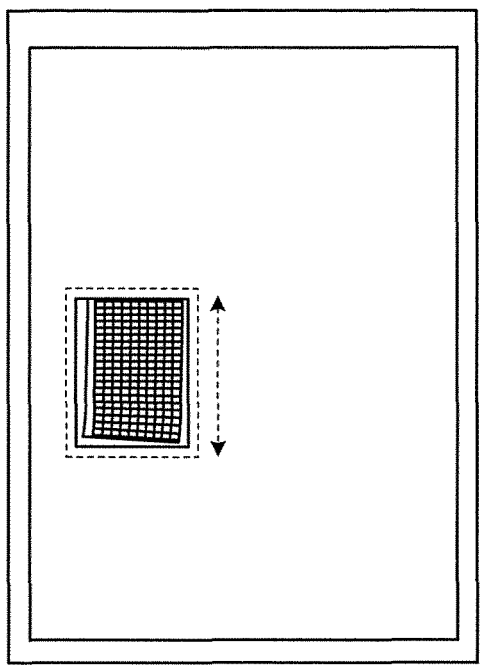
FIG. 8 is a diagram of another example of the process of detecting content skew in the embodiment.

With reference to FIG. 8, an example of the process of detecting content skew in the embodiment using a graphic region will be explained. FIG. 8 is a diagram of an example of the process of detecting content skew in the embodiment.

In the embodiment, a candidate content-skew occurrence position may be detected in such a manner that: a rectangular graphic region is extracted as a direction-identifying content; and closeness of the graphic region to a rectangle is determined.

Here, in the embodiment, a rectangular graphic region may be extracted though the above processes (1) to (3).

Subsequently, in the embodiment, based on whether all angles formed by the four sides thereof are parallel or perpendicular to one another, it is determined whether the extracted rectangular graphic region is a rectangular.

As shown in FIG. 8, in the embodiment, if it is determined that the rectangular graphic region is a rectangle, it may be determined that the angle formed between the approximate straight line and the direction-identifying content is uniform in a section containing this graphic region and that there is no skew in the section containing this graphic region.

On the other hand, in the embodiment, if it is determined that the rectangular graphic region is not a rectangle (has different angles at the upper and the lower edges), the upper and the lower edges of the graphic region may be treated as direction-identifying contents in the same manner as the ruled lines, because it is impossible to determine a location at which skew has started.

In the embodiment, when a plurality of contents having different results have been found at the same position, a candidate content-skew occurrence position may be detected with the highest through the lowest priorities given to a graphic, a ruled line, and a character string.

With reference back to FIG. 3, the accumulated-skew detecting unit 102*h* determines whether the condition is satisfied that the candidate edge-skew occurrence position (an edge-based detected position) and a candidate content-skew occurrence position (a content-based detected position) have been both detected (Step SA-8).

Subsequently, if the accumulated-skew detecting unit 102h has determined that the condition is satisfied that the edge-based detected position and the content-based detected position have both been detected (Yes at Step SA-8), the processing is shifted to Step SA-9.

Subsequently, the accumulated-skew detecting unit 102h determines whether the distance between the two detected positions, that is, the edge-based detected position and the content-based detected position, is equal to or less than a certain distance (for example, 1 cm) (Step SA-9).

Subsequently, if the accumulated-skew detecting unit 102h has determined that the distance between the two detected positions, that is, the edge-based detected position and the content-based detected position, is more than the certain distance (No at Step SA-9), the processing is shifted to Step SA-10.

Subsequently, the accumulated-skew detecting unit 102h assumes that accumulated skew has not occurred, and does not detect the accumulated-skew occurrence position (Step SA-10).

That is, in the embodiment, when the candidate edge-skew occurrence position and the candidate content-skew occurrence position are both present but with a large distance therebetween, it is likely that the shape of the document itself is skewed or that contents are inclined, and these positions can be regarded as positions without accumulated skew.

Subsequently, the image-outputting unit 102j causes the input/output unit 112 to display read image data or document image data (Step SA-11), and the processing is ended.

On the other hand, if the accumulated-skew detecting unit 102h has determined that the distance between the two detected positions, that is, the edge-based detected position and the content-based detected position, is equal to or less than the certain distance (Yes at Step SA-9), the processing is shifted to Step SA-12.

Subsequently, the accumulated-skew detecting unit 102h adopts, as the accumulated-skew occurrence position, one of the edge-based detected position and the content-based detected position that is located rearward from (lower than) the other in the document conveyance direction (Step SA-12).

The accumulated-skew detecting unit 102h is thus capable of detecting the presence of accumulated skew and the accumulated-skew occurrence position.

That is, in the embodiment, when the candidate edge-skew occurrence position and the candidate content-skew occurrence position are both present and are located close to each other, one of these positions that is located lower than the other may be adopted as the accumulated-skew occurrence position.

Figure 9:
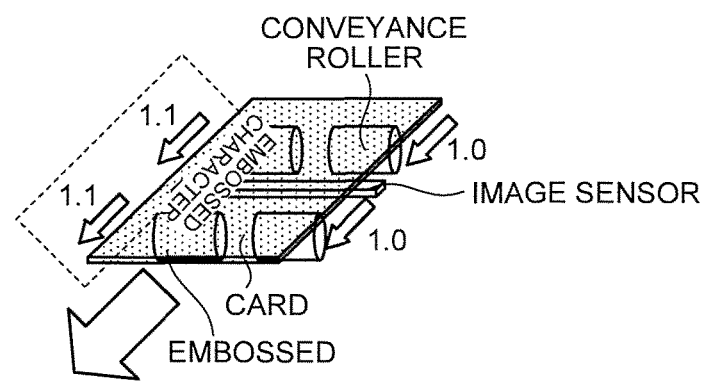
FIG. 9 is a diagram of an example of occurrence of accumulated skew in the embodiment.
Figure 9:
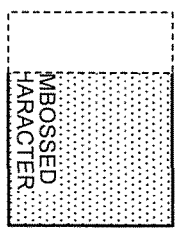
Figure 10:
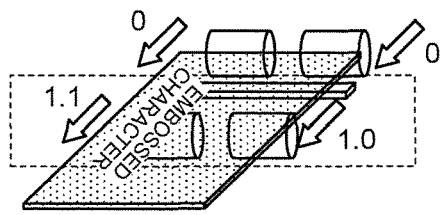
FIG. 10 is another diagram of the example of occurrence of accumulated skew in the embodiment.
Figure 10:
Figure 10:
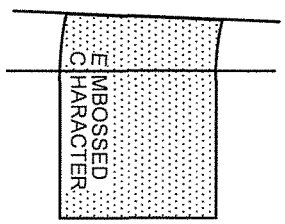

Here, with reference to FIG. 9 and FIG. 10, an example of occurrence of accumulated skew in the embodiment will be explained. FIG. 9 and FIG. 10 are diagrams of the example of occurrence of accumulated skew in the embodiment.

First, the image-reading apparatus 200 including a paper path, such as a general ADF scanner, generally has conveyance rollers provided to the upstream and the downstream sides of an image sensor in an internal part and has a paper guide discontinued without entering the internal part.

Therefore, conveyance of documents after the start of feeding relies on the conveyance rollers. In addition, the conveyance rollers that are actually touching documents are arranged generally in such a manner that a time at which only the last one set thereof touch the document is generated before the rear end of each document completely passes by the image sensor.

Therefore, in a document the gravity center or the thickest part of which does not touch the conveyance rollers evenly in the right-left direction, accumulated skew tends to occur during a time when only the last one conveyance roller in the final phase of conveyance touches the document.

Here, the most conspicuous accumulated skew tends to occur, in a thick and right-left asymmetric document such as a pamphlet or in a document uneven in thickness such as an embossed card, immediately before the end of conveyance thereof.

Here, as shown in FIG. 9, in the first half of conveyance, a plurality of conveyance rollers are linearly located relative to a document (card) having embossed characters printed on one side and having uneven thickness on the right and the left sides, so that these conveyance rollers touch the document perpendicularly thereto.

Therefore, as shown in FIG. 9, in the embodiment, a part of an output image corresponding to the first half of conveyance is conveyed straight regardless of the difference between magnitudes of force that are received by the right and the left sides of the document, thereby being obtained as an image having no skew.

On the other hand, as shown in FIG. 10, only one set of conveyance rollers arranged along the horizontal direction convey the document in the last half of conveyance, so that the difference (1.1−1.0=0.1) between magnitudes of force that are received by the right and the left sides of the document is directly reflected in the conveyance speed, and visibly appears as rotative force.

Consequently, as shown in FIG. 10, in the embodiment, a section in which only one set of conveyance rollers conveys the document is reflected as skew in a part of the output image corresponding to the last half of conveyance. Here, the skew has a fan-like shape in which the difference between magnitudes of force received by the right and the left sides is reflected.

Therefore, as shown in FIG. 10, in the embodiment, an output image is obtained that is composed of a rectangular partial image obtained before the occurrence of accumulated skew and a fan-like partial image obtained after the occurrence of accumulated skew.

That is, when the thickness, the binding manner, or the like of a document is right-left asymmetric, the conveyance rollers being unable to apply right-left symmetric force. As a result, the right and the left sides of the document are conveyed at different speeds, which cause fan-like skew.

Here, in the fan-like part, the longer are represents the original conveyance speed, and the compressed, shorter arc represents a conveyance speed slower than the original one.

Note that, because embossing or folding is often applied to a document evenly from one end thereof to the other, the fan-like part rotates evenly without any changes in rotation and in conveyance speed during the entire rotation.

With reference back to FIG. 3, the accumulated-skew correcting unit 102i acquires accumulated-skew-corrected image data by: assuming that a document rear-part image, which is an image rearward from the accumulated-skew occurrence position in the document conveyance direction, is a region surrounded by two circular sectors; correcting skew by geometrically transforming the arcs of the circular sectors to bring these arcs onto approximate straight lines in the document conveyance direction in such a manner as to elongate the shorter one of these arcs; and performing synthesizing with a document front-part image frontward from the accumulated-skew occurrence position (Step SA-13).

The accumulated-skew correcting unit 102*i* is thus capable of correcting accumulated skew while maintaining readability.

Figure 11:
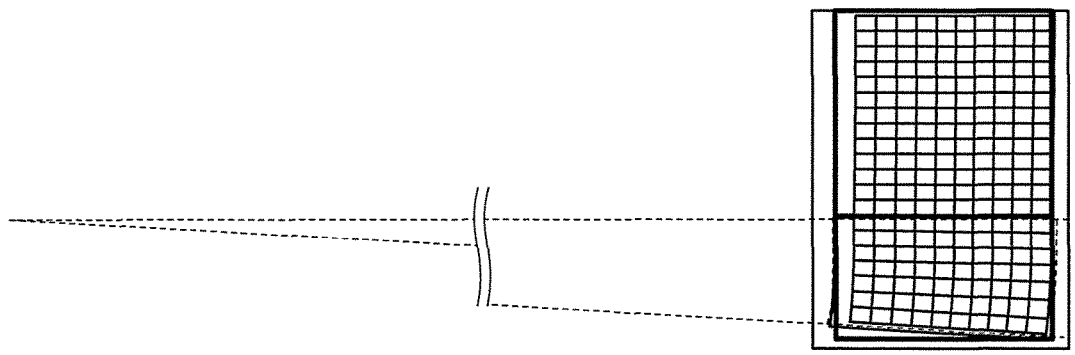
FIG. 11 is a diagram of an example of a document rear-part image in the embodiment.
Figure 12:
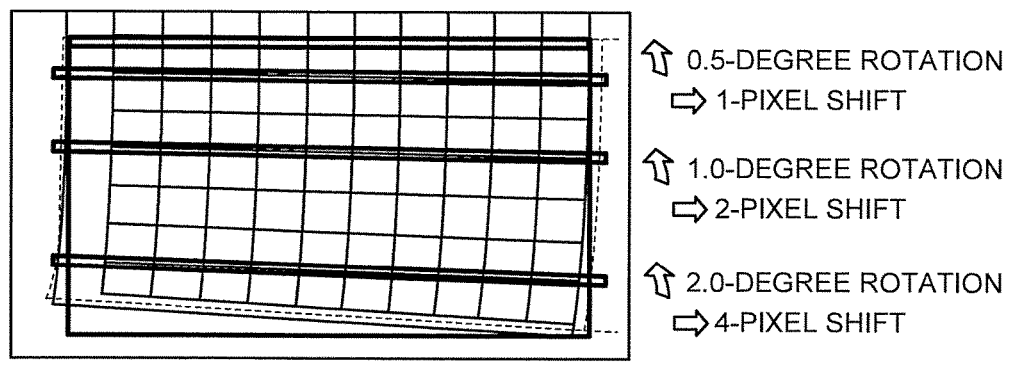
FIG. 12 is a diagram of an example of the process of correcting accumulated skew in the embodiment.

Here, with reference to FIG. 11 and FIG. 12, an example of the process of correcting accumulated skew in the embodiment will be explained. FIG. 11 is a diagram of an example of a document rear-part image in the embodiment. FIG. 12 is a diagram of an example of the process of correcting accumulated skew in the embodiment.

As shown in FIG. 11, in the embodiment, in a document image having accumulated skew detected therein, edges frontward from an accumulated-skew occurrence position can be assumed to be straight lines, edges rearward from the accumulated-skew occurrence position can be approximated by curved lines (the arcs of circular sectors). Therefore, skew may be corrected therein in such a manner that a current skewed shape in the document image is brought close to an ideal shape.

Here, as shown in FIG. 11, the ideal shape may be a rectangle obtained by connecting four intersections of: three approximate straight lines (solid lines in FIG. 11) obtained by extending the respective longest straight-line parts of three edge (at the upper end and the right and left ends) in the document image; and a straight line parallel to the approximate straight line at the upper end.

As shown in FIG. 11, the skewed shape may be approximated by a region bounded by two circular sectors having the same central angle and different radii. Here, the Hough transform may be used as a method for detecting an arc from within the document image.

The arcs of the two circular sectors (dotted curved lines in FIG. 11) may be thus obtained by approximating edges rearward from the accumulated-skew occurrence position by a fan-like shape.

In addition, as shown in FIG. 11, the upper side (a dotted line in FIG. 11) of each of the circular sectors may be obtained by drawing, at the accumulated-skew occurrence position, a line parallel to an edge of the document image at the upper end thereof. The lower side (another dotted line in FIG. 11) of each of the circular sectors may be obtained by directly adopting another edge of the document image at the lower end thereof.

Subsequently, as shown in FIG. 12, in the embodiment, the skewed shape (a fan-like shape) in the last half of conveyance may be corrected into an ideal shape by being geometrically transformed into a rectangle.

Specifically, as shown in FIG. 12, on the right and the left arcs of the circular sectors, sets each consisting of two points on the respective arcs originally supposed to be on the same conveyance position may be found by obtaining the two points in each of the sets as points advanced by the same rate relative to the lengths of the respective arcs (for example, when the right arc is advanced by 1 dot, which corresponds to the rate of 1% of the length thereof, the left arc is advanced by 0.9 dot, which corresponds to the rate of 1% of the length thereof).

Subsequently, as shown in FIG. 12, pixels on a straight line connecting the right and the left points thus found are acquired, and then arranged horizontally side by side so as to follow the approximate straight line. Skew correction may be performed by repeating this process for all rows.

Alternatively, in the embodiment, a lens skew correction process may be employed in which skew correction is performed by extracting feature points from the document image and performing mapping between the ideal shape and the skewed shape.

With reference back to FIG. 3, the image-outputting unit 102*j* causes the input/output unit 112 to display the accumulated-skew-corrected image data obtained by the accumulated-skew correcting unit 102*i* (Step SA-14), and the processing is ended.

On the other hand, if the accumulated-skew detecting unit 102*h* has determined that the condition is not satisfied that the edge-based detected position and the content-based detected position have both been detected (No at Step SA-8), the processing is shifted to Step SA-15.

Subsequently, the accumulated-skew detecting unit 102*h* determines whether the condition is satisfied that, while the edge-based detected position has been detected, the content-based detected position has not been detected (Step SA-15).

Subsequently, if the accumulated-skew detecting unit 102*h* has determined that the condition is satisfied that, while the edge-based detected position has been detected, the content-based detected position has not been detected (Yes at Step SA-15), the processing is shifted to Step SA-16.

Subsequently, the accumulated-skew detecting unit 102*h* adopts the edge-based detected position as an accumulated-skew occurrence position (Step SA-16), and the processing is shifted to Step SA-13.

That is, in the embodiment, when, with a candidate edge-skew occurrence position being present, no content is present near that position, credence may be given to the candidate edge-skew occurrence position, so that the candidate edge-skew occurrence position can be adopted as an accumulated-skew occurrence position.

Note that, in the embodiment, when no candidate content-skew occurrence position is present despite the presence of a candidate edge-skew occurrence position, the candidate edge-skew occurrence position may be adopted as an accumulated-skew occurrence position.

On the other hand, if the accumulated-skew detecting unit 102*h* has determined that the condition is not satisfied that, while the edge-based detected position has been detected, the content-based detected position has not been detected (No at Step SA-15), the processing is shifted to Step SA-17.

Subsequently, the accumulated-skew detecting unit 102*h* determines whether the condition is satisfied that, while the edge-based detected position has not been detected, the content-based detected position has been detected (Step SA-17).

Subsequently, if the accumulated-skew detecting unit 102*h* has determined that the condition is not satisfied that, while the edge-based detected position has not been detected, the content-based detected position has been detected (No at Step SA-17), the processing is shifted to Step SA-10.

On the other hand, if the accumulated-skew detecting unit 102*h* has determined that the condition is satisfied that, while the edge-based detected position has not been detected, the content-based detected position has been detected (Yes at Step SA-17), the processing is shifted to Step SA-18.

Subsequently, the accumulated-skew detecting unit 102*h* adopts the content-based detected position as an accumulated-skew occurrence position (Step SA-18), and the processing is shifted to Step SA-13.

That is, in the embodiment, when no candidate edge-skew occurrence position is present despite the presence of a candidate content-skew occurrence position, the candidate content-skew occurrence position may be adopted as an accumulated-skew occurrence position.

Here, with reference to FIG. 13 to FIG. 17, an example of the process of detecting accumulated skew in the embodiment will be explained. FIG. 13 to FIG. 17 are diagrams of the example of the process of detecting accumulated skew in the embodiment.

Figure 13:
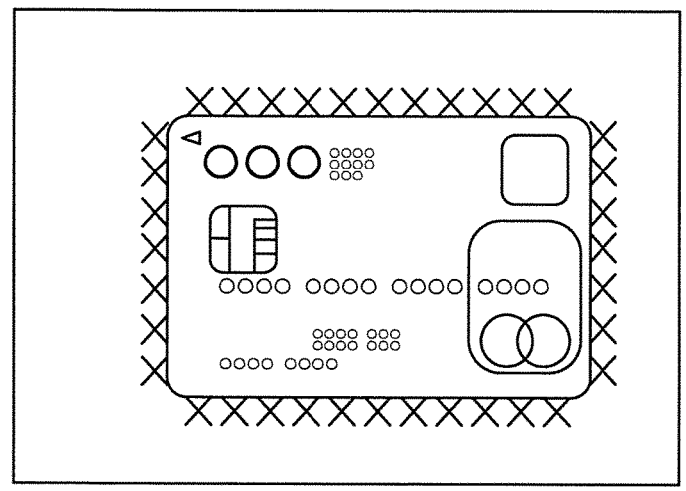
FIG. 13 is a diagram of an example of the process of detecting accumulated skew in the embodiment.

At the start, as shown in FIG. 13, four edges (that is, the shape of a document image) are detected from a document image (card image) corrected for front-end skew. In the embodiment, as the edges, edges detected in detection of the front-end skew may be used.

Figure 14:
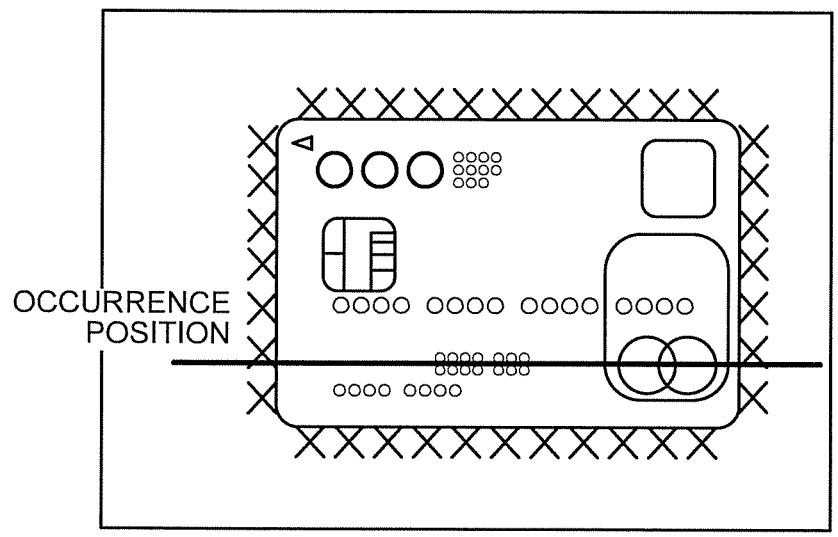
FIG. 14 is another diagram of the example of the process of detecting accumulated skew in the embodiment.

Subsequently, as shown in FIG. 14, each of the detected edges is approximated by one straight line, this approximate straight line is assumed to be a part of an ideal side supposed to have been obtained without the presence of skew. Here, in the embodiment, a straight line detected in detection of the front-end skew may be used as an approximate straight line.

Subsequently, as shown in FIG. 14, how distant the respective edges are from the approximate straight lines thereof is found, and, because there is an edge that gradually deviates from the approximate straight line thereof (that is, skews in the same direction) during conveyance after the occurrence of accumulated skew, it is then detected whether all of the edges are continuing to move in the same direction.

Subsequently, as shown in FIG. 14, a position at which an edge has started deviating from the approximate straight line thereof may be detected as a candidate edge-skew occurrence position.

Figure 15:
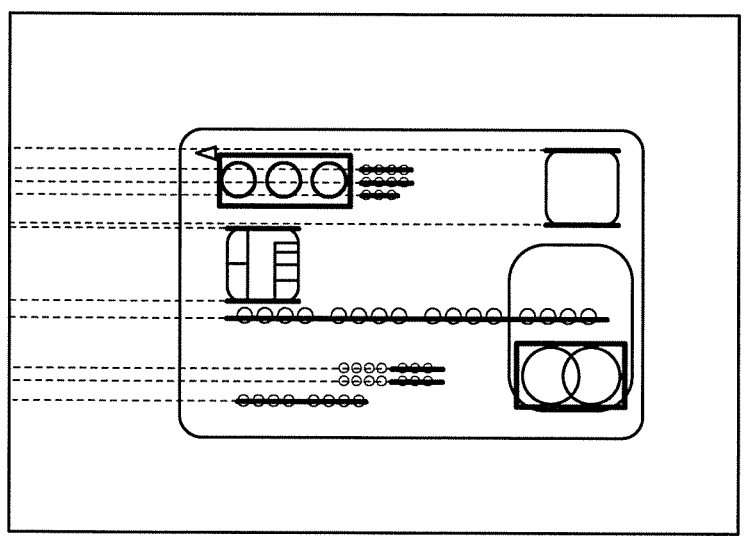
FIG. 15 is another diagram of the example of the process of detecting accumulated skew in the embodiment.

Subsequently, as shown in FIG. 15, the inclination of each content (for example, any one, some, or all of a character string, a ruled line, and a photographic rectangle) may be detected.

Figure 16:
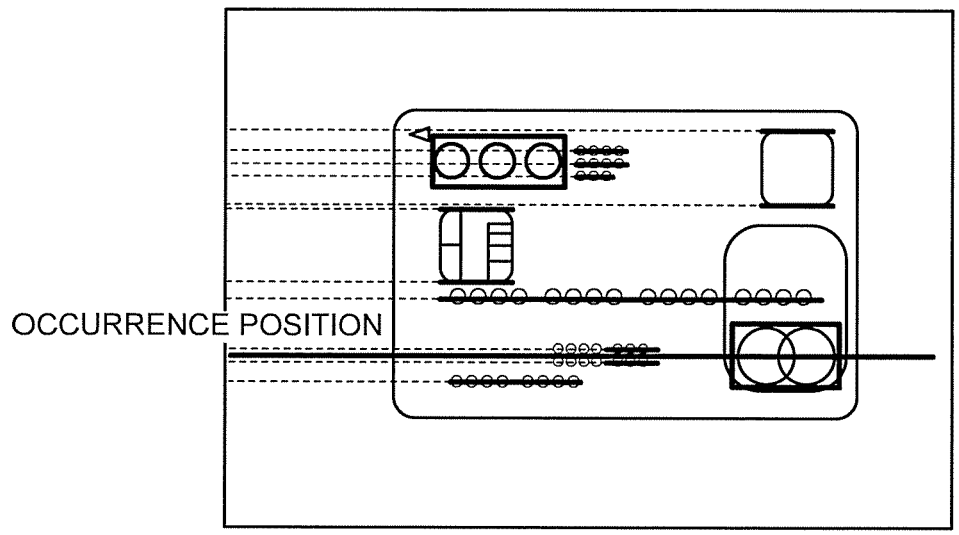
FIG. 16 is another diagram of the example of the process of detecting accumulated skew in the embodiment.

Subsequently, as shown in FIG. 16, when the inclination of any content has been detected, it may be detected in the same manner as the edges whether the inclination of the content is continuing to change in the same direction (clockwise or counterclockwise) during conveyance after the occurrence of accumulated skew.

Subsequently, as shown in FIG. 16, this position may be detected as the candidate content-skew occurrence position.

Figure 17:
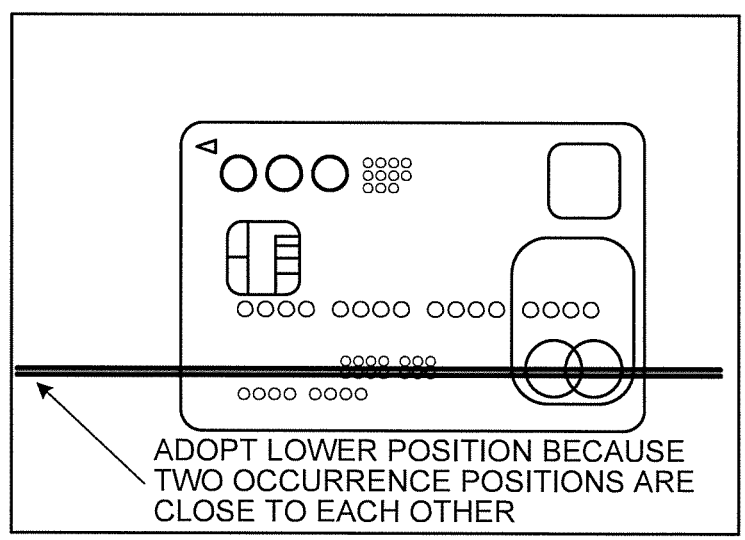
FIG. 17 is another diagram of the example of the process of detecting accumulated skew in the embodiment.

Subsequently, as shown in FIG. 17, the presence or absence of a candidate edge-skew occurrence position and the presence or absence of a candidate content-skew occurrence position are found, so that, based the combination of the presence or absence of these positions, the occurrence of eventual accumulated skew and an accumulated-skew occurrence position may be detected.

Thus, in the embodiment, an accumulated-skew occurrence position may be highly accurately detected while erroneous detection is prevented with edges (the shape of a document image) and inclinations of contents (contents in a document) taken into account.

Here, in the embodiment, when an accumulated-skew occurrence position is detected, the higher priority may be given to inclinations of contents because a document may have a rip or the like therein and sometimes result in a document image that is not a rectangle.

In the embodiment, accumulated skew of a document image can be thus detected and corrected based only on the image.

Here, in general, a document is conveyed straight in touch with a plurality of rollers part of the way, and tends to have conspicuous accumulated skew in the final phase of conveyance when it is conveyed only by the last roller.

Therefore, in the embodiment, to detect accumulated skew from an image, a position at which accumulated skew has occurred is specified based on edges of a document image and an inclination of a content in the document image, and the presence or absence of accumulated skew and the shape thereof are detected.

Note that, when accumulated skew occurs from start to finish because of age-related degradation of conveyance rollers, grime thereon, damage thereto, or the like, the entirety of a document image may be regarded as being in a state during the occurrence of accumulated skew.

In this instance, the accumulated skew is caused by a situation in which the conveyance rollers are not able to apply force symmetrically in the right-to-left direction, and can be avoided by wiping out the grime or replacing the rollers.

In addition, in the embodiment, when accumulated skew has been detected, correction may be performed in such a manner that: the edges are approximated by a rectangle and by circular sectors in parts read before and after the occurrence of skew, respectively; and a region rearward from an accumulated-skew occurrence position and bounded by the two circular sectors is assumed to be ideally rectangular.

In a scanner apparatus that conveys documents, skew during the conveyance has conventionally been one of the major inconveniences.

Such skew is what is called accumulated skew, which tends to occur during conveyance of a document that is conveyed by force exceeding the conveyance force of rollers or the like, or a document that has irregular thickness or shape (for example, an embossed card, or a pamphlet in the form of a booklet as it originally has been).

There has further been an inconvenience such that, when hardware and a document the combined use of which causes accumulated skew are used in combination, a usable image is unavailable despite successful conveyance.

Given this situation, various hardware-based solutions for these inconveniences have been attempted such as a structure less likely to cause accumulated skew, and a structure that detects accumulated skew and prompts retry.

However, it has been difficult to completely solve these inconveniences, and it has been impossible to address other challenges such as application to smaller pieces of hardware and correction to images that have been already produced.

Given this situation, the embodiment provides a method for correcting a read image so that the read image can appear as if no accumulated skew has occurred during conveyance.

Other Embodiments

The embodiment of the present disclosure has been explained so far. Besides the foregoing embodiment, the present disclosure can also be carried out in various different embodiments within the scope of the technical idea described in the claims.

For example, the image-processing apparatus 100 may perform processing in a standalone mode, or may perform processing according to a request from a client terminal (separate from the image-processing apparatus 100) and then return the results of the processing to the client terminal.

Out of the processes explained in relation to the embodiment, all or some of the processes explained as being automatically performed may be manually performed, or all or some of the processes explained as being manually performed may be automatically performed by publicly known methods.

Besides, the process steps, the control steps, the specific names, the information including registered data for the processes or parameters such as search conditions, the screen examples, or the database configurations described or illustrated herein or the drawings can be appropriately changed if not otherwise specified.

The constituent elements of the image-processing apparatus 100 shown in the drawings are conceptual functions and do not necessarily need to be physically configured as shown in the drawings.

For example, all or any part of the processing functions included in the units of the image-processing apparatus 100, in particular, the processing functions performed by the control unit 102 may be implemented by the CPU or programs interpreted and executed by the CPU, or may be implemented by wired logic-based hardware.

The programs including programmed instructions for causing a computer to execute methods according to the present disclosure described later are recorded in non-transitory computer-readable recording media, and are mechanically read by the image-processing apparatus 100 as necessary. Specifically, the computer programs for giving instructions to the CPU to perform various processes in cooperation with an operating system (OS) are recorded in the storage unit 106 such as a ROM or a hard disk drive (HDD). The computer programs are loaded into the RAM and executed, and constitute a control unit in cooperation with the CPU.

The computer programs may be stored in an application program server connected to the image-processing apparatus 100 via an appropriate network, and may be entirely or partly downloaded as necessary.

The programs according to the present disclosure may be stored in computer-readable recording media or may be formed as program products. The "recording media" include any portable physical media such as a memory card, a USB memory, an SD card, a flexible disc, a magneto optical disc (MO), a ROM, an erasable programmable read only memory (EPROM), an electrically erasable programmable read only memory (EEPROM), a compact disc read only memory (CD-ROM), a DVD, and a Blu-ray (registered trademark) disc.

The "programs" constitute data processing methods described in an appropriate language or by an appropriate describing method, and are not limited in format such as source code or binary code. The "programs" are not limited to singly-configured ones but may be distributed into a plurality of modules or libraries or may perform their functions in conjunction with another program typified by an OS. Specific configurations for reading the recording media by the units according to the embodiment, specific procedures for reading the programs, or specific procedures for installing the read programs may be well-known configurations or procedures.

The various databases and others stored in the storage unit 106 may be storage units such as any one, some, or all of a memory device such as a RAM or a ROM, a fixed disc device such as a hard disc, a flexible disc, and an optical disc, and may store any one, some, or all of various programs, tables, databases, and web page files for use in various processes and web site provision.

The image-processing apparatus 100 may be an information processing apparatus such as a well-known personal computer, and an appropriate peripherals may be connected to the information processing apparatus. The image-processing apparatus 100 may be embodied by providing the information processing apparatus with software (including programs, data, and the like) for implementing the methods according to the present disclosure.

Further, the specific modes of distribution and integration of the devices are not limited to the ones illustrated in the drawings but all or some of the devices may be functionally or physically distributed or integrated by a predetermined unit according to various additions and the like or functional loads. That is, the foregoing embodiments may be carried out in any appropriate combination or may be selectively carried out.

The present disclosure makes it possible to efficiently correct accumulated skew that is inclination of a document image that tends to occur when a document that needs conveyance force exceeding that of conveyance rollers or the like or a document that has irregular thickness or shape is conveyed, during the last half of conveyance of the document, depending on how force from the conveyance rollers is applied.

According to the present disclosure, correction can be made to obtain the same result as if skew had been able to be prevented in a hardware-based manner. Further, according to the present disclosure, application to images read by existing pieces of hardware is possible, and there is no need for improvement of hardware.

Therefore, the present disclosure makes it possible to provide a highly flexible method for correcting accumulated skew without any change in hardware such as providing a paper-feeding route of a certain size to forcibly prevent skew, or increasing the number of conveyance rollers to constantly have at least two rollers conveying a document to the end of the conveyance.

That is, the present disclosure does not need design change in hardware that leads to increase in size of a conveyance device, restriction on sheet sizes, or the like, and therefore can correspond to images read by various kinds of hardware.

Although the disclosure has been described on specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-processing apparatus comprising:
an image acquiring unit configured to acquire read image data of a read image read by an image-reading apparatus including a paper path;
an edge detecting unit configured to detect edges of a document image contained in the read image and acquires approximate straight lines by extending the longest straight-line parts of the respective edges;
an edge-skew detecting unit configured to detect, as a candidate edge-skew occurrence position, on one of the approximate straight lines that is in a document conveyance direction, a position at which the one approximate straight line and an edge containing the longest straight-line part of the one approximate straight line start to separate from each other;
a content detecting unit configured to detect direction-identifying contents defined as contents usable for specifying directions within the document image;
a content-skew detecting unit configured to detect, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the conveyance direction;

an accumulated-skew detecting unit configured to detect an accumulated-skew occurrence position, based on the candidate edge-skew occurrence position and the candidate content-skew occurrence position; and an accumulated-skew correcting unit configured to acquire accumulated-skew-corrected image data by correcting skew in a document rear-part image located rearward from the accumulated-skew occurrence position in the conveyance direction.

2. The image-processing apparatus according to claim 1, wherein the content-skew detecting unit detects, as the candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and a side of a rectangular graphic region, the rear angle being an angle between the one approximate straight line and one of the direction-identifying contents that is located rearward from the rectangular graphic region in the conveyance direction.

3. The image-processing apparatus according to claim 1, wherein the content-skew detecting unit detects, as the candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and a ruled line, the rear angle being an angle between the one approximate straight line and one of the direction-identifying contents that is located rearward from the ruled line in the conveyance direction.

4. The image-processing apparatus according to claim 1, wherein the content-skew detecting unit detects, as the candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and a character string, the rear angle being an angle between the one approximate straight line and one of the direction-identifying contents that is located rearward from the character string in the conveyance direction.

5. The image-processing apparatus according to claim 4, wherein the content detecting unit detects an angle between the one of the approximate straight lines that is in the conveyance direction and the character string in the document image by: detecting the character string; calculating areas of rectangles circumscribed to the character string while rotating the character string, the rectangles each being defined by line segments parallel to the one approximate straight line in the conveyance direction and horizontal line segments; and specifying a rotation angle corresponding to the smallest one of the areas.

6. The image-processing apparatus according to claim 4, wherein the content detecting unit detects an angle between the one of the approximate straight lines that is in the conveyance direction and the character string in the document image by: detecting the character string; performing optical character recognition on the character string while rotating the character string; and specifying a rotation angle at which accuracy of the character recognition is the highest.

7. The image-processing apparatus according to claim 1, wherein, on conditions that the candidate edge-skew occurrence position and the candidate content-skew occurrence position have been detected and that the distance between the detected positions is equal to or less than a certain distance, the accumulated-skew detecting unit detects, as the accumulated-skew occurrence position, one of the candidate positions that is located rearward from the other in the conveyance direction.

8. The image-processing apparatus according to claim 1, wherein, on conditions that the candidate edge-skew occurrence position has been detected by the edge-skew detecting unit and that the direction-identifying contents have not been detected by the content detecting unit, the accumulated-skew detecting unit detects the candidate edge-skew occurrence position as the accumulated-skew occurrence position.

9. The image-processing apparatus according to claim 1, wherein, on conditions that the candidate edge-skew occurrence position has been detected by the edge-skew detecting unit and that the candidate content-skew occurrence position has not been detected by the content-skew detecting unit, the accumulated-skew detecting unit detects the candidate edge-skew occurrence position as the accumulated-skew occurrence position.

10. The image-processing apparatus according to claim 1, wherein, on conditions that the candidate edge-skew occurrence position has not been detected by the edge-skew detecting unit and that the candidate content-skew occurrence position has been detected by the content-skew detecting unit, the accumulated-skew detecting unit detects the candidate content-skew occurrence position as the accumulated-skew occurrence position.

11. The image-processing apparatus according to claim 1, wherein the accumulated-skew correcting unit acquires the accumulated-skew-corrected image data by: assuming that the document rear-part image is a region bounded by two circular sectors; and correcting skew by bringing the arcs of the circular sectors onto the approximate straight lines that are in the conveyance direction.

12. The image-processing apparatus according to claim 1, further comprising:
a front-end skew detecting unit configured to detect front-end skew defined as an inclination of the document image with respect to the read image by detecting inclinations of all of the approximate straight lines with respect to the read image; and
a front-end skew correcting unit configured to correct, based on the front-end skew, the document image to erect the document image.

13. The image-processing apparatus according to claim 1, wherein the accumulated-skew correcting unit acquires the accumulated-skew-corrected image data by: assuming that the document rear-part image is a region bounded by two circular sectors; and correcting skew by geometrically transforming the arcs of the circular sectors onto the approximate straight lines that are in the conveyance direction.

14. The image-processing apparatus according to claim 1, wherein the accumulated-skew correcting unit acquires the accumulated-skew-corrected image data by: assuming that the document rear-part image is a region bounded by two circular sectors; and correcting skew by geometrically transforming the arcs of the circular sectors, in a manner that extends the shorter one of the arcs, onto the approximate straight lines that are in the conveyance direction.

15. The image-processing apparatus according to claim 1, wherein the accumulated-skew correcting unit acquires the accumulated-skew-corrected image data by correcting skew by performing lens skew correction on the document rear-part image.

16. The image-processing apparatus according to claim 1, wherein the content detecting unit extracts straight-line elements of the contents by a Hough transform.

17. An image-processing method comprising:
- an image acquiring step of acquiring read image data of a read image read by an image-reading apparatus including a paper path;
- an edge detecting step of detecting edges of a document image contained in the read image and acquiring approximate straight lines by extending the longest straight-line parts of the respective edges;
- an edge-skew detecting step of detecting, as a candidate edge-skew occurrence position, on one of the approximate straight lines that is in a document conveyance direction, a position at which the one approximate straight line and an edge containing the longest straight-line part of the one approximate straight line start to separate from each other;
- a content detecting step of detecting direction-identifying contents defined as contents usable for specifying directions within the document image;
- a content-skew detecting step of detecting, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the conveyance direction;
- an accumulated-skew detecting step of detecting an accumulated-skew occurrence position, based on the candidate edge-skew occurrence position and the candidate content-skew occurrence position; and
- an accumulated-skew correcting step of acquiring accumulated-skew-corrected image data by correcting skew in a document rear-part image located rearward from the accumulated-skew occurrence position in the conveyance direction.

18. A computer program product having a non-transitory tangible computer readable medium including programmed instructions for causing, when executed by a computer,
- the computer to perform an image-processing method comprising:
- an image acquiring step of acquiring read image data of a read image read by an image-reading apparatus including a paper path;
- an edge detecting step of detecting edges of a document image contained in the read image and acquiring approximate straight lines by extending the longest straight-line parts of the respective edges;
- an edge-skew detecting step of detecting, as a candidate edge-skew occurrence position, on one of the approximate straight lines that is in a document conveyance direction, a position at which the one approximate straight line and an edge containing the longest straight-line part of the one approximate straight line start to separate from each other;
- a content detecting step of detecting direction-identifying contents defined as contents usable for specifying directions within the document image;
- a content-skew detecting step of detecting, as a candidate content-skew occurrence position, on the one of the approximate straight lines in the conveyance direction, a position at which a rear angle is larger than a front angle and at which the front angle first becomes equal to or more than a certain angle, the front angle being an angle between the one approximate straight line and each of the direction-identifying contents, the rear angle being an angle between the one approximate straight line and one of the direction-identifying contents that is located rearward from the each of the direction-identifying contents in the conveyance direction;
- an accumulated-skew detecting step of detecting an accumulated-skew occurrence position, based on the candidate edge-skew occurrence position and the candidate content-skew occurrence position; and
- an accumulated-skew correcting step of acquiring accumulated-skew-corrected image data by correcting skew in a document rear-part image located rearward from the accumulated-skew occurrence position in the conveyance direction.

* * * * *